(12) United States Patent
West et al.

(10) Patent No.: US 8,534,606 B2
(45) Date of Patent: Sep. 17, 2013

(54) PIPE COUPLING DEVICE FOR AIRCRAFT WING

(75) Inventors: Colin John West, Bristol (GB); David Alistair Sutton, Bristol (GB)

(73) Assignee: Airbus Operations Limited, Bristol (GB)

( * ) Notice: Subject to any disclaimer, the term of this patent is extended or adjusted under 35 U.S.C. 154(b) by 457 days.

(21) Appl. No.: 12/832,118

(22) Filed: Jul. 8, 2010

(65) Prior Publication Data

US 2011/0147523 A1   Jun. 23, 2011

(30) Foreign Application Priority Data

Jul. 9, 2009   (GB) .................................. 0911876.1

(51) Int. Cl.
  *B64D 37/00*  (2006.01)
  *B64C 3/00*  (2006.01)
  *B64C 1/00*  (2006.01)

(52) U.S. Cl.
  USPC ...................................... 244/131; 244/135 R

(58) Field of Classification Search
  USPC ............... 244/131, 135 R, 135 A, 123.1, 1 A; 285/145.5, 148.3, 148.2, 226; 361/215, 218
  See application file for complete search history.

(56) References Cited

U.S. PATENT DOCUMENTS

| 2,375,614 | A | * | 5/1945 | Berger et al. | ............ 285/148.13 |
| 2,470,989 | A | * | 5/1949 | Keller et al. | .................. 285/226 |
| 2,693,223 | A | * | 11/1954 | Krupp | ............................ 156/144 |
| 2,731,278 | A | * | 1/1956 | Soderstrom | .................. 285/226 |
| 2,936,185 | A | * | 5/1960 | Olsen et al. | .................... 285/226 |
| 3,921,611 | A | * | 11/1975 | Walker | ..................... 123/568.29 |
| 4,059,293 | A | | 11/1977 | Sipler | |
| 4,985,801 | A | * | 1/1991 | Hellard et al. | ................. 361/215 |
| 5,143,122 | A | * | 9/1992 | Adkins | ........................... 361/215 |
| 5,568,944 | A | * | 10/1996 | Kawasaki | ..................... 285/236 |
| 6,321,794 | B1 | * | 11/2001 | Ishida et al. | .................. 138/121 |
| 6,880,862 | B2 | * | 4/2005 | Mobley et al. | ................ 285/238 |

FOREIGN PATENT DOCUMENTS

| DE | 1255446 B | 11/1967 |
| FR | 2792245 A1 | 10/2000 |
| GB | 2244179 A | 11/1991 |

OTHER PUBLICATIONS

British Search Report for GB0911876.1 dated Nov. 9, 2009.

* cited by examiner

*Primary Examiner* — Tien Dinh
*Assistant Examiner* — Richard R Green
(74) *Attorney, Agent, or Firm* — Lowe Hauptman & Ham

(57) ABSTRACT

An aircraft wing comprising first and second fuel pipe segments which are coupled together with a pipe coupling device comprising a corrugated tube formed from an elastomer filled with conductive material. The pipe coupling device is particularly useful for connecting together fuel pipe segments in an aircraft wing as it removes the need to attach bonding leads between fuel pipe segments to dissipate lightning currents and static.

10 Claims, 2 Drawing Sheets

PIPE COUPLING DEVICE FOR AIRCRAFT WING

RELATED APPLICATIONS

The present application is based on, and claims priority from, British Application Number 0911876.1, filed Jul. 9, 2009, the disclosure of which is hereby incorporated by reference herein in its entirety.

FIELD OF THE INVENTION

The present invention relates to an aircraft wing comprising first and second fuel pipe segments which are coupled together with a pipe coupling device.

BACKGROUND OF THE INVENTION

Gamah™ fittings are known for connecting together adjacent fuel pipe segments in aircraft fuel systems. These fittings contain O-ring seals. However, the use of these conventional fuel pipe joints can often be undesirable. One problem is that the O-ring seals are non-conductive. This makes it necessary to attach bonding leads between the Gamah™ fitting and the fuel pipe segments for the safe dissipation of lightning currents, and to prevent static electricity build up which could lead to sparking. This adds significant weight to the design. Moreover, these joints often do not provide sufficient flexibility to account for the relative movement of adjacent fuel pipe segments caused by wing bending.

U.S. Pat. No. 4,059,293 describes an elastomeric bellows-type connector for joining together two tubular members. If such a connector was used in an aircraft fuel system, it would still be necessary to attach bonding leads between fuel pipe segments as elastomers are non-conductive.

SUMMARY OF THE INVENTION

The present invention provides an aircraft wing comprising first and second fuel pipe segments which are coupled together with a pipe coupling device comprising a corrugated tube formed from an elastomer filled with conductive material.

The coupling device is preferably bonded to the first and second fuel pipe segments, either by a bonding agent or by co-curing the coupling device with the first and second fuel pipe segments.

Preferably the fuel pipe assembly further comprises a third fuel pipe segment coupled to the second fuel pipe segment by a second pipe coupling device which permits less relative movement between the second and third fuel pipe segments than the first coupling device permits between the first and second fuel pipe segments.

The pipe coupling device is particularly suited for use in an aircraft wing, since it can permit a high degree of movement.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
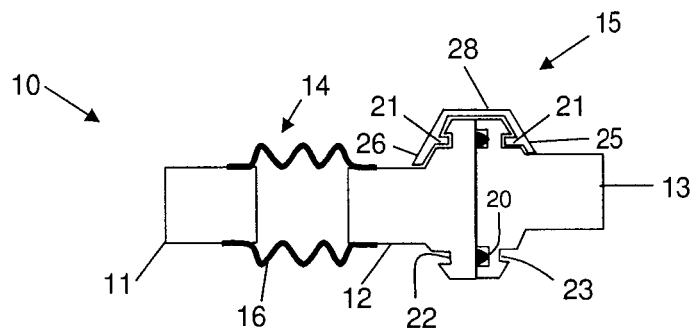
FIG. 1a is a sectional view of a fuel pipe assembly.
Figure 1B:
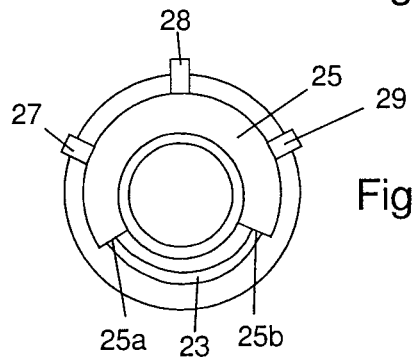
FIG. 1b is an end view of the assembly.

FIG. 1 is a sectional view of a fuel pipe assembly 10 comprising first, second and third fuel pipe segments 11-13 for carrying fuel inside an aircraft wing. The first segment 11 is attached to the second segment 12 at a first joint 14 while the second segment 12 is attached to the third segment 13 at a second joint 15. At the first joint 14, the adjacent ends of the first and second fuel pipe segments 11, 12 are connected with a flexible bellows-type connector 16 formed from a conductive elastomer. This will be described in more detail below. At the second joint 15, the adjacent ends of the second and third fuel pipe segments 12, 13 are clamped together by a spring clip. The spring clip comprises two gripping member 25, 26 which are C-shaped when viewed along the axis of the pipe as shown in FIG. 1b. The gripping members 25, 26 each have flanges 21 which fit into annular external slots 22, 23 in the second and third fuel pipe segments 12, 13 respectively. The gripping members 25, 26 are connected to each other by three bridging members 27-29 which are spaced equally around the pipe as shown in FIG. 1b. The spring clip creates a rigid joint which inhibits surge, yaw and pitch of the second segment 12 relative to the third segment 13. The third fuel pipe segment 13 also has an annular internal slot while the second fuel pipe segment 12 has a corresponding O-ring 20 which seals against the internal slot when the two segments are brought together.

With reference to FIG. 1b, the clip is fitted by gripping the central bridging member 28 and pushing the clip down so that the opposite ends 25a, 25b of the C-shaped gripping members 25, 26 are pushed apart by the pipe segment 13, 12 respectively, enabling the clip to be pushed down further. As the ends 25a, 25b pass the mid-point of the pipe segments, they spring back together to the secure position shown in FIG. 1b. The clip can be removed by pulling up on the bridging member 28 and reversing the fitting procedure.

The spring clip is similar to the Keck™ KC19 spring clip manufactured by Schott AG (see www.schott.com). It may be formed from a variety of materials including Nylon, polyurethane or PEEK.

Figure 2:
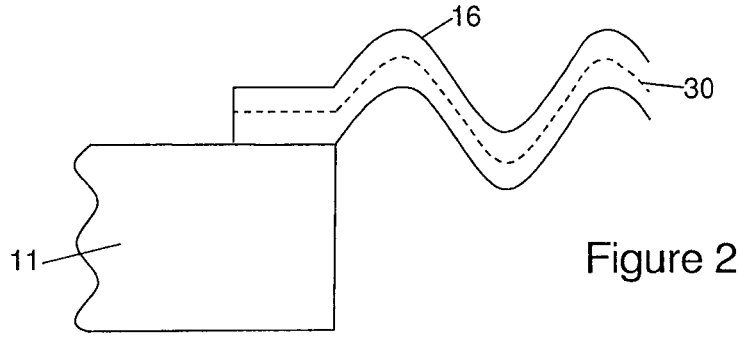
FIG. 2 is a close up view of the bellows-type connector shown in FIG. 1.

A close up sectional view of part of the first joint 14 is shown in FIG. 2. The bellows-type connector 16 is formed from an elastomer, such as polyurethane or fluorosilicon rubber, which is filled with conductive material, such as carbon black or carbon nanotubes, to provide an electrically conductive pathway between the first and second fuel pipe segments. The connector 16 is a generally cylindrical corrugated tube. The ridges and valleys of the corrugations run circumferentially around the tube at right angles to the connector's central axis. Alternatively the ridges and valleys of the corrugations run may run helically around the tube.

The conductive filler material allows the bellows-type connector 16 to conduct lightning currents and static electricity between the fuel pipe segments 11, 12. This prevents the need for bonding leads which provides a significant weight saving. The bellows-type connector 16 also contains a reinforcement element 30 which extends along its length in order to stiffen and strengthen it. The interior of the fuel pipe assembly can be subjected to pressures between −40 and 130 psi when in use, and the reinforcement element 30 prevents the connector 16 from collapsing in a vacuum, or inflating when a large positive pressure is applied. The reinforcement element may be, for example, a metallic strip or a layer of glass or aramid fabric.

Other benefits of using an elastomeric coupling device over the more conventional connectors (e.g. Gamah™ connectors) include:
- elastomers, such as fluorosilicon rubber with glass or aramid fabric as reinforcement, are significantly less dense than metals, leading to weight savings
- the additional flexibility provided by these connectors reduces the number of parts required
- the need for protective coatings and lubricants on fittings, which can be worn during service, is removed
- the bellows-type connector 16 can be used for both metal and composite pipes, and dissimilar materials can be joined The bellows-type connector 16 is typically bonded to the fuel pipe segments 11, 12 by a rubber bonding agent. The connector 16 is first moulded and partially cured. Then the pipe segments 11, 12 are painted with a rubber bonding agent. Next, the connector 16 is pushed over the pipe segments 11, 12 and clamped in place. Finally, the assembly is heated in an oven to fully cure the connector 16 and the bonding agent.

If the fuel pipe segments 11, 12 are formed from composite material, then the bellows-type connector 16 can be co-cured with them.

Figure 3:
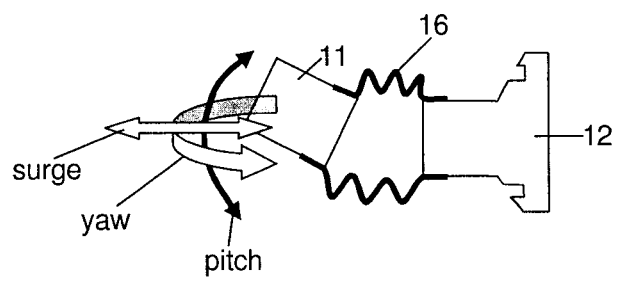
FIG. 3 is a similar sectional view to FIG. 1 illustrating the three degrees of freedom provided by the bellows-type connector.

As indicated in FIG. 3, the bellows-type connector 16 allows the first fuel pipe segment 11 to move relative to the second segment 12 with three degrees of freedom (pitch, yaw and surge). The use of this type of joint allows the fuel pipe assembly to flex in response to wing bending, which occurs during service, substantially decreasing the possibility of damage to the fuel pipe assembly. On the other hand, as mentioned above, the second joint 15 allows very little, or substantially no relative movement between the second and third fuel pipe segments 12, 13. This type of joint is therefore used on areas of the aircraft wing where no relative movement is required between the adjacent fuel pipe segments. The combination of the flexible joint 14, provided by the elastomeric bellows-type connector 16, and the rigid joint 15 is thus particularly useful in the optimisation of the fuel pipe configuration on an aircraft wing. It will be appreciated that the rigid joint 15 could be of any suitable design and is not limited to the joint described above.

Figure 4:
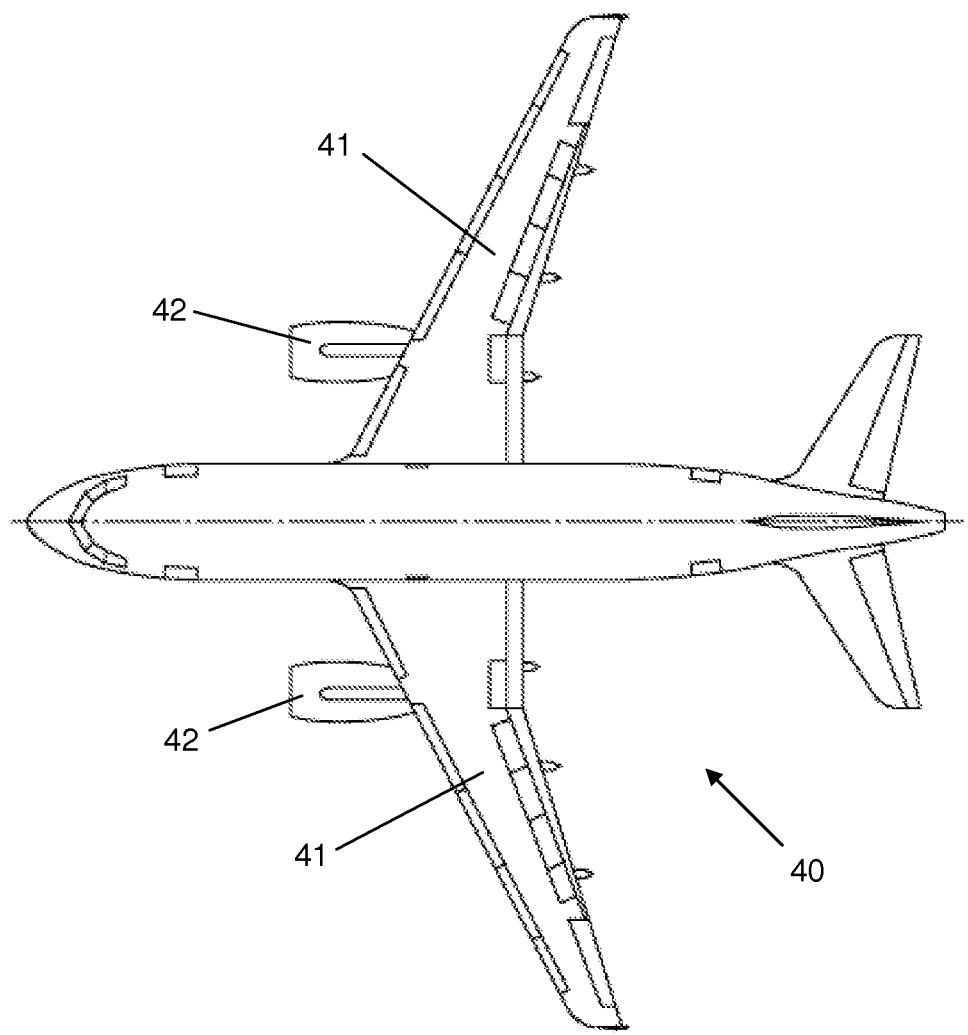
FIG. 4 is a plan view of an aircraft incorporating the fuel pipe assembly of FIG. 1.

FIG. 4 is a plan view of an aircraft comprising a pair of wings 41, each carrying a respective engine 42. Each wing 41 contains a number of fuel tanks which provide fuel for the engines 42 via a system of fuel pipes. The fuel pipe system within each wing comprises one or more fuel pipe assemblies of the kind shown in FIG. 1.

Although the invention has been described above with reference to one or more preferred embodiments, it will be appreciated that various changes or modifications may be made without departing from the scope of the invention as defined in the appended claims.

The invention claimed is:

1. An aircraft wing, comprising: first and second fuel pipe segments which are coupled together with a pipe coupling device comprising a corrugated tube formed from an elastomer filled with conductive material to provide an electrically conductive pathway between the first and second fuel pipe segments; and, a third fuel pipe segment coupled to the second fuel pipe segment by a second pipe coupling device which directly contacts the third and the second fuel pipe segments and permits less relative movement between the second and third fuel pipe segments than the first coupling device permits between the first and second fuel pipe segments.

2. The wing of claim 1 further comprising a reinforcement element extending along the length of the pipe coupling device.

3. The wing of claim 2 wherein the reinforcement element comprises a fabric.

4. The wing of claim 1 wherein the elastomer is filled with carbon particles.

5. The wing of claim 1 wherein the elastomer is filled with carbon nanotubes.

6. The wing of claim 1 wherein the coupling device is bonded to the first and second fuel pipe segments.

7. The wing of claim 1 wherein the first and second fuel pipe segments are formed from a composite material.

8. The wing of claim 7 wherein the coupling device is co-cured with the first and second fuel pipe segments.

9. The wing of claim 1 wherein the coupling device allows movement of the second segment relative to the first segment with three degrees of freedom, namely pitch, yaw and surge.

10. The wing of claim 1 wherein the second pipe coupling device is a spring clip.

\* \* \* \* \*